United States Patent
Chueh et al.

(10) Patent No.: US 8,013,477 B2
(45) Date of Patent: Sep. 6, 2011

(54) POWER SYSTEM HAVING A POWER SAVING MECHANISM

(75) Inventors: Chin-Sheng Chueh, Taoyuan (TW); Po-Wen Wang, Taipei County (TW); Chien-Kun Huang, Taipei County (TW); Chia-Tse Yeh, Taoyuan County (TW); Yung-Chun Lin, Taoyuan County (TW); Jiun-Wei Tseng, Changhua County (TW)

(73) Assignee: Qisda Corporation, Taoyuan County (TW)

( * ) Notice: Subject to any disclaimer, the term of this patent is extended or adjusted under 35 U.S.C. 154(b) by 218 days.

(21) Appl. No.: 12/512,973

(22) Filed: Jul. 30, 2009

(65) Prior Publication Data

US 2010/0277957 A1    Nov. 4, 2010

(30) Foreign Application Priority Data

Apr. 30, 2009    (TW) ................................ 98114332 A

(51) Int. Cl.
*H01H 9/54*    (2006.01)

(52) U.S. Cl. ...................................................... 307/140
(58) Field of Classification Search ................... 307/140
See application file for complete search history.

(56) References Cited

U.S. PATENT DOCUMENTS 6,480,401 B2 *    11/2002    Tang ........................... 363/21.02
* cited by examiner

*Primary Examiner* — Robert L. Deberadinis

(57) ABSTRACT

A power system having a power saving mechanism includes a voltage regulator, a power input module, and a switching signal generation unit. The voltage regulator performs a regulation operation on a first voltage for generating a second voltage. The power input module includes a transformer, a rectifying unit, a switch, and a switch control unit. The rectifying unit together with the transformer is put in use for converting an input voltage into the first voltage. The switch is employed to control a current flowing through the primary winding of the transformer. The switch control unit generates a control signal for controlling the switch according to a switching signal. The switching signal generation unit is utilized for generating the switching signal to disable the switch control unit during an energy transfer disable interval so as to decrease the first voltage from a first predetermined voltage to a second predetermined voltage.

20 Claims, 10 Drawing Sheets

US 8,013,477 B2

POWER SYSTEM HAVING A POWER SAVING MECHANISM

BACKGROUND OF THE INVENTION

1. Field of the Invention

The present invention relates to a power system, and more particularly, to a power system having a power saving mechanism.

2. Description of the Prior Art

Along with the advantages of high efficiency, low power consumption, small size and light weight, the flyback power system has been widely employed as a power converter in various electronic products. Please refer to FIG. 1, which is a circuit structure diagram schematically showing a prior-art flyback power system 100. A rectifying circuit 102 and a filter capacitor 105 are employed to generate an input voltage Vin through performing rectification and filter operations on an alternating input voltage Vac provided by an alternating power supply 101. A transformer 120 comprises a primary winding 121 for receiving the input voltage Vin, a secondary winding 122, and an auxiliary winding 123. A first rectify/filter circuit 170 is utilized for performing rectification and filter operations on a preliminary output voltage Vop induced by the secondary winding 122 for generating a first output voltage Vo1 forwarded to a first load 195. A voltage regulation circuit 180 functions to regulate the first output voltage Vo1 for generating a second output voltage Vo2 furnished to a second load 196. A feedback circuit 140 is put in use for converting the second output voltage Vo2 into a feedback signal Sfb furnished backwards to a switch control circuit 130. A second rectify/filter circuit 190 is employed to perform rectification and filter operations on an induced voltage of the auxiliary winding 123 for generating a power voltage Vcc to power the switch control circuit 130. By making use of the feedback signal Sc, the switch control circuit 130 generates a control signal Sc for controlling on/off states of a switch 125, which in turn controls a current flowing through the primary winding 121.

Regarding the operation of the flyback power system 100, the first output voltage Vo1 for powering the first load 195 is significantly greater than the second voltage Vo2 for powering the second load 196. After entering a power-saving operation mode, only the second voltage Vo2 is required to continue powering the second load 196 while the first load 195 is not required to be powered. However, the first output voltage Vo1 is still retained to hold a high voltage level. Under such situation, the flyback power system 100 will waste redundant power for keeping the high voltage level of the first output voltage Vo1 and therefore the power efficiency of the power-saving operation mode is degraded.

SUMMARY OF THE INVENTION

In accordance with one embodiment of the present invention, a power system having a power saving mechanism is disclosed. The power system comprises a voltage regulator, a capacitor, a power input module, and a switching signal generation unit. The voltage regulator includes a voltage input port for receiving a first voltage and a voltage output port for outputting a second voltage. The capacitor is electrically connected between the voltage input port of the voltage regulator and a voltage reference level. The power input module comprises a transformer, a rectification unit, a switch, and a switch control unit. The transformer includes a primary winding for receiving an input voltage, a secondary winding, and an auxiliary winding. The rectification unit, electrically connected between the secondary winding and the voltage input port of the voltage regulator, is employed to generate the first voltage. The switch is electrically connected to the primary winding in series and functions to control a current flowing through the primary winding. The switch control unit, electrically connected to the auxiliary winding and the switch, is put in use for generating a control signal to control on/off states of the switch. The switching signal generation unit, electrically connected to the voltage output port of the voltage regulator, is utilized for generating a switching signal to disable the switch control unit during an energy transfer disable interval so as to decrease the first voltage from a first predetermined voltage to a second predetermined voltage.

In accordance with another embodiment of the present invention, a power system having a power saving mechanism is disclosed. The power system comprises a voltage regulator, a switching signal generation unit, a feedback processing circuit, and a power input module. The voltage regulator includes a voltage input port for receiving a first voltage and a voltage output port for outputting a second voltage. The switching signal generation unit, electrically connected to the voltage output port or the voltage input port of the voltage regulator, is utilized for generating a switching signal according to an indication signal. The feedback processing circuit, electrically connected to the voltage input port of the voltage regulator and the switching signal generation unit, is used to generate a feedback signal according to the first voltage and the switching signal. The power input module comprises a transformer, a rectification unit, a switch, and a switch control unit. The transformer includes a primary winding for receiving an input voltage, a secondary winding, and an auxiliary winding. The rectification unit, electrically connected between the secondary winding and the voltage input port of the voltage regulator, is employed to generate the first voltage. The switch is electrically connected to the primary winding in series and functions to control a current flowing through the primary winding. The switch control unit, electrically connected to the auxiliary winding and the switch, is put in use for generating a control signal to control on/off states of the switch according to the feedback signal.

Still, in accordance with another embodiment of the present invention, a power system having a power saving mechanism is disclosed. The power system comprises a voltage regulator, a switching signal generation unit, a feedback processing circuit, a first switch, and a power input module. The voltage regulator includes a voltage input port for receiving a first voltage, a voltage output port for outputting a second voltage, and an enable port for receiving a first switching signal. The switching signal generation unit, electrically connected to the voltage output port or the voltage input port of the voltage regulator, is utilized for generating the first switching signal, a second switching signal and a third switching signal according to an indication signal. The feedback processing circuit, electrically connected to the voltage input port of the voltage regulator and the switching signal generation unit, is used to generate a feedback signal according to the first voltage and the second switching signal. The first switch, electrically connected between the voltage input port and the voltage output port of the voltage regulator, is utilized for controlling an electrical connection between the voltage input port and the voltage output port of the voltage regulator according to the third switching signal. The power input module comprises a transformer, a rectification unit, a second switch, and a switch control unit. The transformer includes a primary winding for receiving an input voltage, a secondary winding, and an auxiliary winding. The rectification unit, electrically connected between the secondary winding and the voltage input port of the voltage regulator, is used to generate the first voltage. The second switch is electrically connected to the primary winding in series and functions to control a current flowing through the primary winding. The switch control unit, electrically connected to the auxiliary winding and the second switch, is put in use for generating a control signal to control on/off states of the second switch according to the feedback signal.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto.

Figure 1:
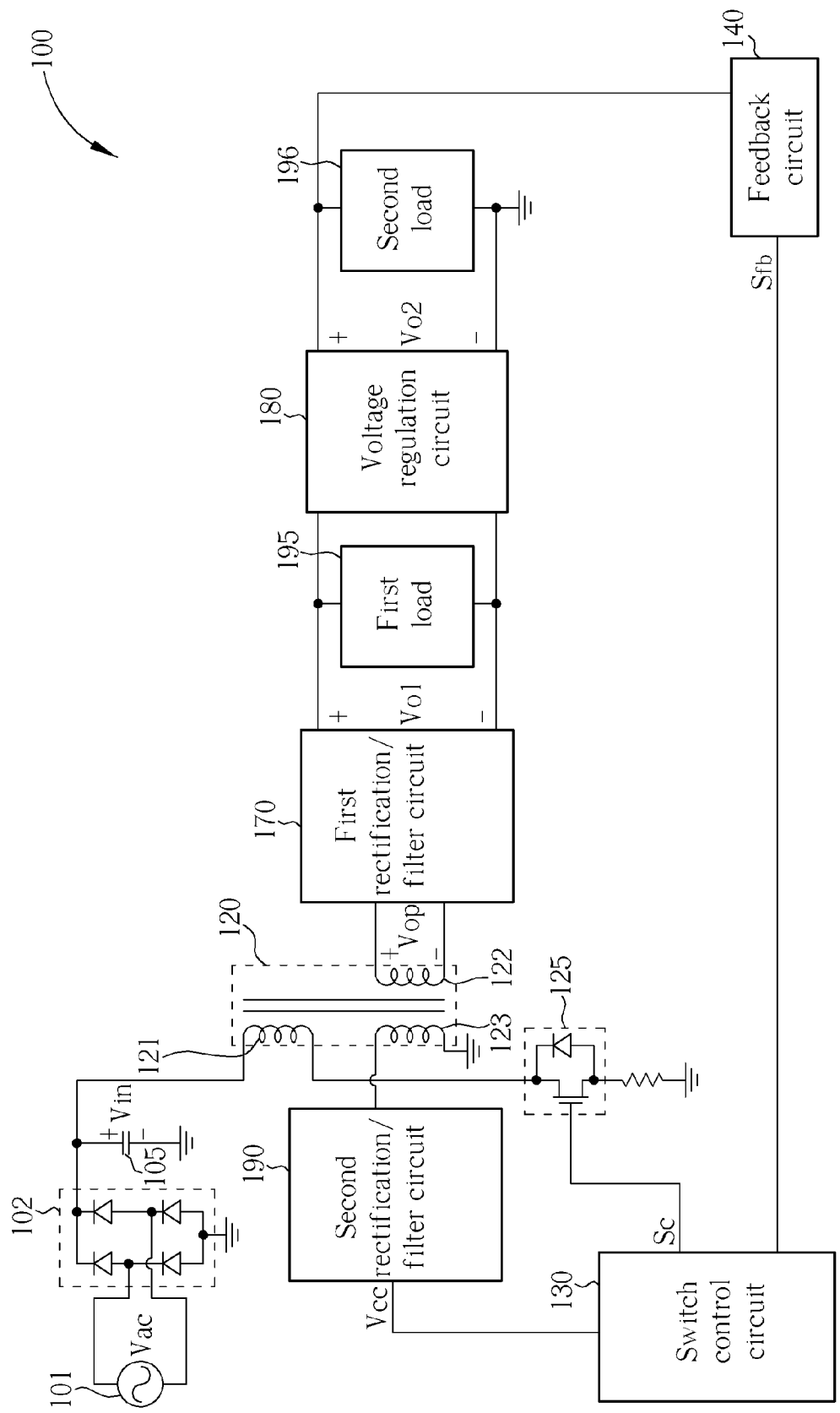
FIG. 1 is a circuit structure diagram schematically showing a prior-art flyback power system.
Figure 2:
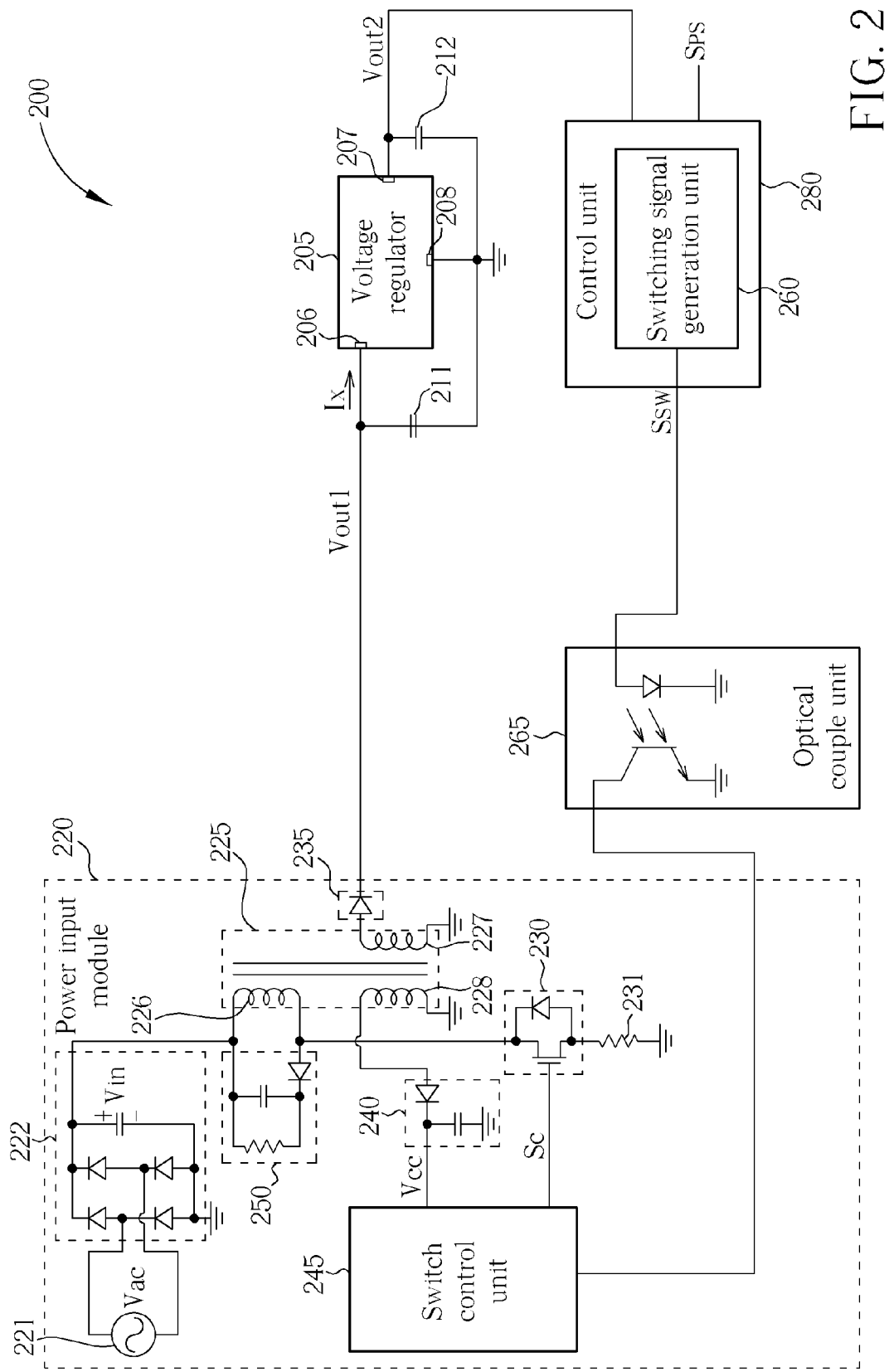
FIG. 2 is a circuit structure diagram schematically showing a power system in accordance with a first embodiment of the present invention.

Please refer to FIG. 2, which is a circuit structure diagram schematically showing a power system 200 in accordance with a first embodiment of the present invention. As shown in FIG. 2, the power system 200 comprises a voltage regulator 205, a first capacitor 211, a second capacitor 212, a power input module 220, a control unit 280, and an optical couple unit 265. The voltage regulator 205 includes a voltage input port 206 for receiving a first voltage Vout1, a voltage output port 207 for outputting a second voltage Vout2 less than the first voltage Vout1, and a common port 208 electrically connected to a voltage reference level. In the embodiment shown in FIG. 2, the voltage reference level is a ground level. The control unit 280 comprises a switching signal generation unit 260. The first capacitor 211, electrically connected between the voltage input port 206 of the voltage regulator 205 and the voltage reference level, is employed to perform charging/discharging operations. The second capacitor 212 is electrically connected between the voltage output port 207 of the voltage regulator 205 and the voltage reference level.

The power input module 220 comprises an alternating power supply 221, a first rectification/filter unit 222, a transformer 225, a switch 230, a resistor 231, a rectification unit 235, a second rectification/filter unit 240, a switch control unit 245, and a snubber circuit 250. The switch 230 can be a metal oxide semiconductor field effect transistor (MOSFET) or a junction field effect transistor (JFET). The first rectification/filter unit 222 is used to generate an input voltage Vin through performing rectification and filter operations on an alternating input voltage Vac provided by the alternating power supply 221. The transformer 225 includes a primary winding 226 for receiving the input voltage Vin, a secondary winding 227, and an auxiliary winding 228. The second winding 227 and the rectification unit 235 are put in use together for generating the first voltage Vout1. The switch 230, electrically connected to the primary winding 226 in series, is employed to control a current flowing through the primary winding 226. The snubber circuit 250, electrically connected to the primary winding 226 and the switch 230, functions to protect the switch 230 from damage while turning off. The resistor 231 is electrically connected between the switch 230 and a voltage reference level such as the ground level.

The second rectification/filter unit 240, electrically connected between the auxiliary winding 228 and the switch control unit 245, is employed to perform rectification and filter operations on an induced voltage of the auxiliary winding 228 for generating a power voltage Vcc to power the switch control unit 245. The switch control unit 245, electrically connected to the switch 230 and the second rectification/filter unit 240, is used to generate a control signal Sc according to a switching signal Ssw. The control signal Sc is a pulse width modulation (PWM) signal for controlling the switch 230. The control unit 280, electrically connected to the voltage output port 207 of the voltage regulator 205, is powered with the second voltage Vout2. The control unit 280 generates the switching signal Ssw according to a power saving signal Sps received.

When the power saving signal Sps enables a power saving operation mode, the control unit 280 functions to set periodical energy transfer disable and enable intervals according to the ripple swing voltage range of the first voltage Vout1, the capacitance of the first capacitor 211, and the current Ix received by the voltage input port 206 of the voltage regulator 205. Furthermore, the control unit 280 drives the switching signal generation unit 260 to generate the switching signal Ssw for disabling the switch control unit 245 during the energy transfer disable interval. Accordingly, the control signal Sc holds a low voltage level during the energy transfer disable interval so as to continue turning off the switch 230 for disabling an energy transfer from the primary winding 226 to the secondary winding 227.

In another embodiment, the energy transfer disable and enable intervals are predetermined and provided to the control unit 280 for driving the switching signal generation unit 260 to generate the switching signal Ssw for periodically disabling the switch control unit 245. The optical couple unit 265, electrically connected between the switch control unit 245 and the switching signal generation unit 260, is employed to provide an optical couple interface for electrically isolating the switch control unit 245 and the switching signal generation unit 260.

Figure 3:
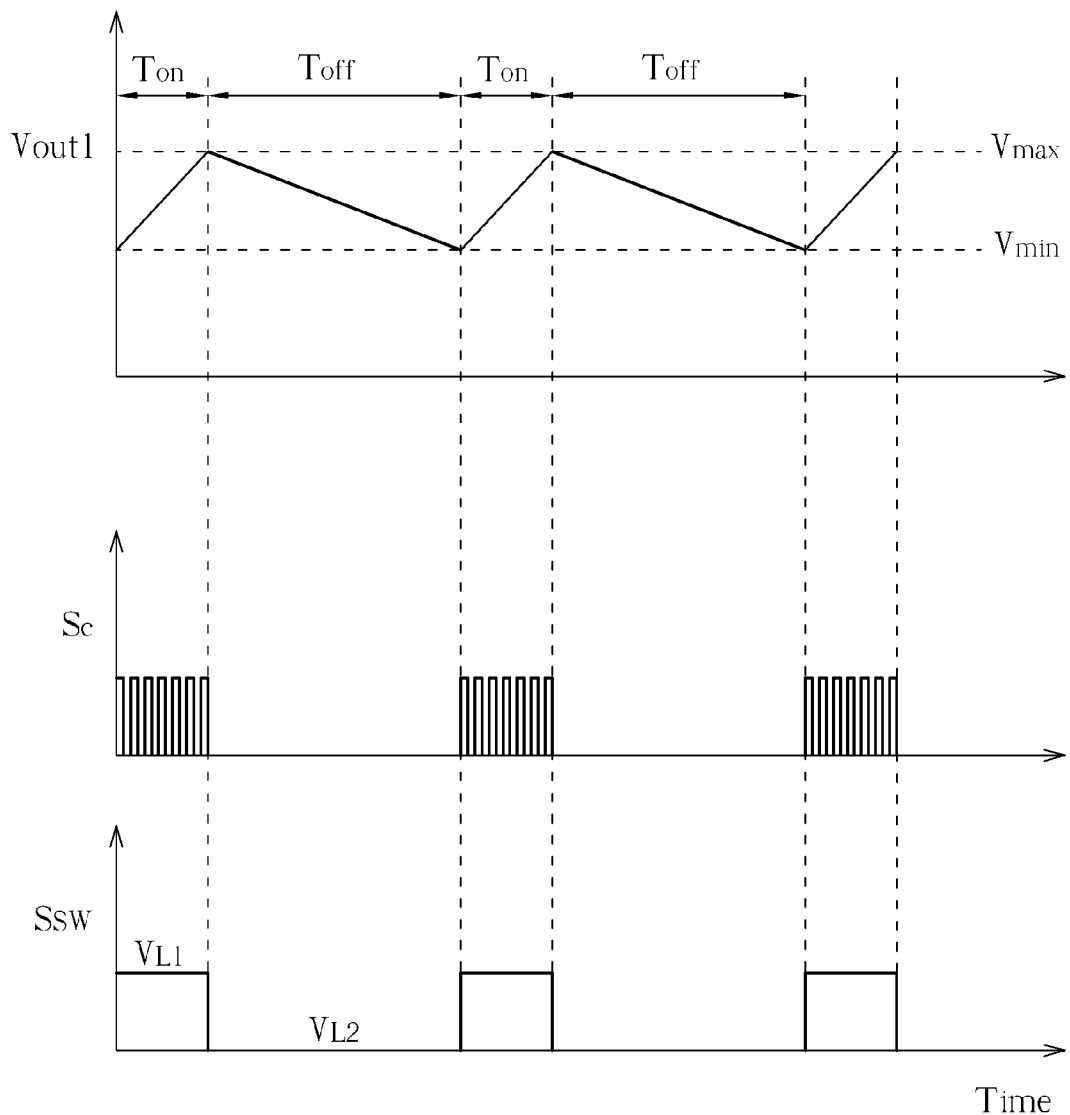
FIG. 3 is a schematic diagram showing related signal waveforms regarding the power-saving operation of the power system in FIG. 2, having time along the abscissa.

FIG. 3 is a schematic diagram showing related signal waveforms regarding the power-saving operation of the power system 200 in FIG. 2, having time along the abscissa. The signal waveforms in FIG. 3, from top to bottom, are the first voltage Vout1, the control signal Sc, and the switching signal Ssw. Please refer to FIG. 3 together with FIG. 2, when the switching signal Ssw holds a first voltage level VL1 during an energy transfer enable interval Ton, the switch control unit 245 is enabled to generate the control signal Sc having corresponding duty cycle, which in turn controls the switch 230 for enabling an energy transfer from the primary winding 226 to the secondary winding 227. Accordingly, the first voltage Vout1 is rising from a low ripple voltage Vmin to a high ripple voltage Vmax. When the switching signal Ssw holds a second voltage level VL2 during an energy transfer disable interval Toff, the switch control unit 245 is disabled and therefore the control signal Sc retains a low voltage level so as to continue turning off the switch 230 for disabling an energy transfer from the primary winding 226 to the secondary winding 227. Accordingly, the first voltage Vout1 is falling from the high ripple voltage Vmax to the low ripple voltage Vmin. The energy transfer disable interval Toff can be expressed as Formula (1) listed below.

$$Toff = \frac{C \times \Delta V}{Ix} \quad \text{Formula (1)}$$

In Formula (1), C represents the capacitance of the first capacitor 211 and ΔV represents the voltage difference between the high ripple voltage Vmax and the low ripple voltage Vmin. The low ripple voltage Vmin can be the lowest voltage required for driving the voltage regulator 205 to output the stable second voltage Vout2 desired. With the above in mind, it is obvious that the power system 200 is able to reduce power consumption through periodically disabling the switch control unit 245 under power-saving operation, for significantly enhancing power efficiency.

Figure 4:
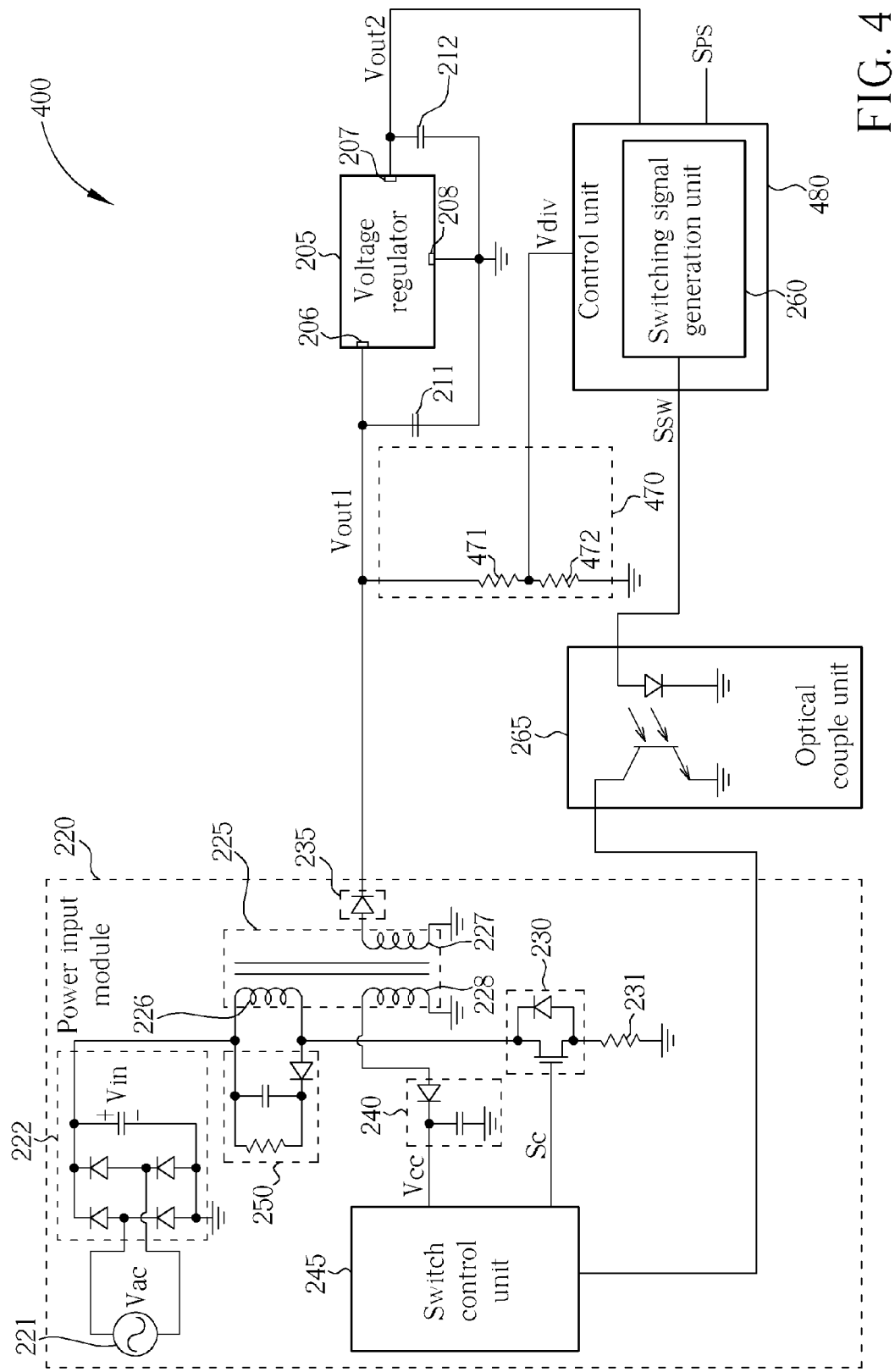
FIG. 4 is a circuit structure diagram schematically showing a power system in accordance with a second embodiment of the present invention.

Please refer to FIG. 4, which is a circuit structure diagram schematically showing a power system 400 in accordance with a second embodiment of the present invention. As shown in FIG. 4, the power system 400 is similar to the power system 200 shown in FIG. 2, the difference is that the control unit 280 is replaced with a control unit 480 and a voltage dividing unit 470 is further added. The voltage dividing unit 470, electrically connected between the voltage input port 206 of the voltage regulator 205 and a voltage reference level such as the ground level, functions to provide a divided voltage Vdiv of the first voltage Vout1. The divided voltage Vdiv is furnished to the control unit 480. Accordingly, the control unit 480 is capable of driving the switching signal generation unit 260 to generate the switching signal Ssw according to the divided voltage Vdiv. In the embodiment shown in FIG. 4, the voltage dividing unit 470 comprises a first resistor 471 and a second resistor 472 connected in series. In another embodiment, the voltage dividing unit 470 may comprise two MOS field effect transistors connected in series and the divided voltage Vdiv is generated through performing a voltage dividing operation on the first voltage Vout1 according to the channel resistances of the two MOS field effect transistors. Still, in another embodiment, the voltage dividing unit 470 can be omitted and the control unit 480 is connected directly to the voltage input port 206 of the voltage regulator 205 so that the control unit 480 drives the switching signal generation unit 260 to generate the switching signal Ssw through detecting the first voltage Vout1.

Figure 5:
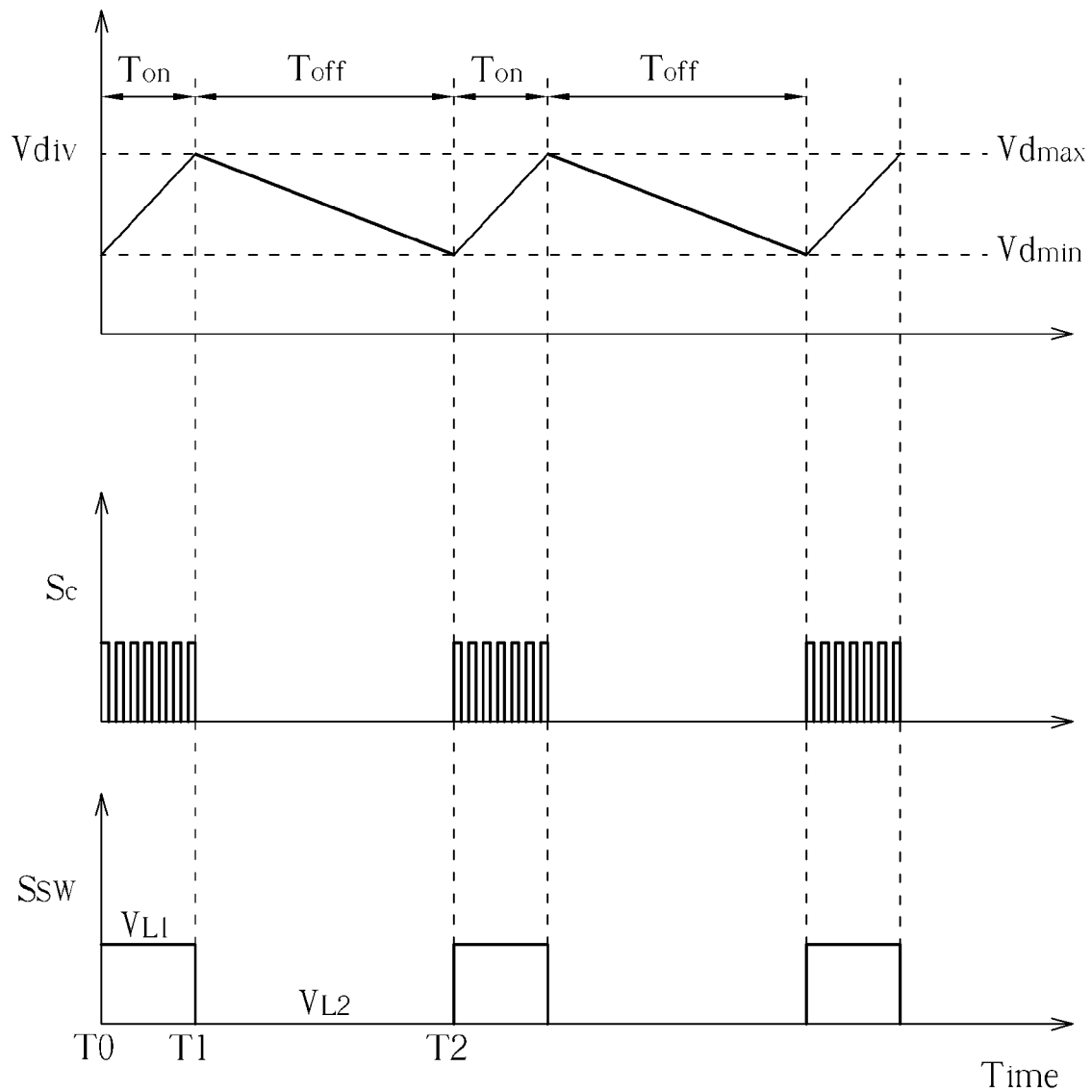
FIG. 5 is a schematic diagram showing related signal waveforms regarding the power-saving operation of the power system in FIG. 4, having time along the abscissa.

FIG. 5 is a schematic diagram showing related signal waveforms regarding the power-saving operation of the power system 400 in FIG. 4, having time along the abscissa. The signal waveforms in FIG. 5, from top to bottom, are the divided voltage Vdiv, the control signal Sc, and the switching signal Ssw. Please refer to FIG. 5 together with FIG. 4, when the switching signal Ssw holds a first voltage level VL1 at time T0, the switch control unit 245 is enabled to generate the control signal Sc having corresponding duty cycle, which in turn controls the switch 230 for enabling an energy transfer from the primary winding 226 to the secondary winding 227. Accordingly, the divided voltage Vdiv is rising from a low ripple voltage Vdmin upwards.

When the divided voltage Vdiv is rising to a high ripple voltage Vdmax at time T1, the switching signal generation unit 260 outputs the switching signal Ssw with a second voltage level VL2 for disabling the switch control unit 245. Therefore, the control signal Sc retains a low voltage level so as to continue turning off the switch 230 for disabling an energy transfer from the primary winding 226 to the secondary winding 227. Accordingly, the divided voltage Vdiv is falling from the high ripple voltage Vdmax downwards. When the divided voltage Vdiv is falling to the low ripple voltage Vdmin at time T2, the switching signal generation unit 260 outputs the switching signal Ssw with the first voltage level VL1 for enabling the switch control unit 245. The switch control unit 245 enabled generates the control signal Sc having corresponding duty cycle, which in turn controls the switch 230 for enabling an energy transfer from the primary winding 226 to the secondary winding 227. Accordingly, the divided voltage Vdiv is rising again from the low ripple voltage Vdmin upwards.

Continue referring to FIG. 5, the time difference between the times T2 and T1 is corresponding to an energy transfer disable interval Toff, and the time difference between the times T1 and T0 is corresponding to an energy transfer enable interval Ton. In other words, the switching signal generation unit 260 is capable of swapping the voltage level of the switching signal Ssw directly based on the high ripple voltage Vdmax and the low ripple voltage Vdmin instead of based on predetermined energy transfer disable and enable intervals Toff, Ton so as to provide an accurate energy transfer control mechanism. Similarly, the power system 400 is also able to reduce power consumption through periodically disabling the switch control unit 245 under power-saving operation, for significantly enhancing power efficiency.

Figure 6:
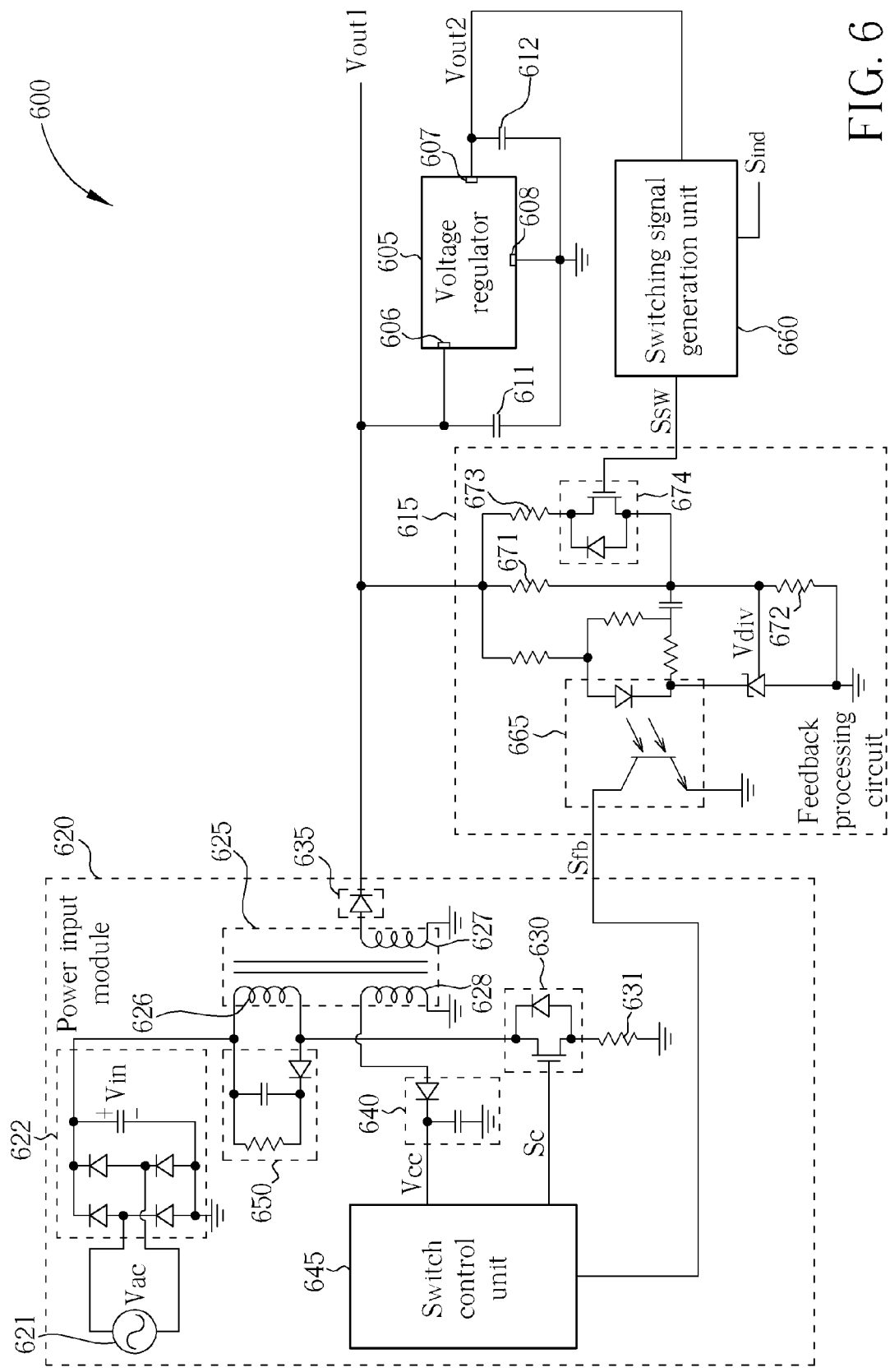
FIG. 6 is a circuit structure diagram schematically showing a power system in accordance with a third embodiment of the present invention.

Please refer to FIG. 6, which is a circuit structure diagram schematically showing a power system 600 in accordance with a third embodiment of the present invention. As shown in FIG. 6, the power system 600 comprises a voltage regulator 605, a first capacitor 611, a second capacitor 612, a feedback processing circuit 615, a power input module 620, and a switching signal generation unit 660. The voltage regulator 605 includes a voltage input port 606 for receiving a first voltage Vout1, a voltage output port 607 for outputting a second voltage Vout2, and a common port 608 electrically connected to a voltage reference level such as a ground level. The first capacitor 611 is electrically connected between the voltage input port 606 of the voltage regulator 605 and a voltage reference level such as the ground level. The second capacitor 612 is electrically connected between the voltage output port 607 of the voltage regulator 605 and a voltage reference level such as the ground level. The power input module 620 comprises an alternating power supply 621, a first rectification/filter unit 622, a transformer 625, a first switch 630, a resistor 631, a rectification unit 635, a second rectification/filter unit 640, a switch control unit 645, and a snubber circuit 650. The internal circuit structure of the power input module 620 is identical to that of the power input module 220 shown in FIG. 2, and for the sake of brevity, further similar discussion thereof is omitted.

The switching signal generation unit 660, electrically connected to the voltage output port 607 of the voltage regulator 605, is powered with the second voltage Vout2. In another embodiment, the switching signal generation unit 660 can be electrically connected to the voltage input port 606 of the voltage regulator 605 so as to be powered with the first voltage Vout1. The switching signal generation unit 660 functions to generate a switching signal Ssw for controlling the circuit operation of the feedback processing circuit 615 according to an indication signal Sind. The feedback processing circuit 615, electrically connected to the voltage input port 606 of the voltage regulator 605 and the switching signal generation unit 660, is employed to generate the feedback signal Sfb according to the first voltage Vout1 and the switching signal Ssw.

The feedback processing circuit 615 includes an optical couple unit 665, a first resistor 671, a second resistor 672, a third resistor 673, and a second switch 674. The optical couple unit 665, electrically connected to the switch control unit 645, is utilized for outputting the feedback signal Sfb. That is, the feedback processing circuit 615 outputs the feedback signal Sfb based on an electrical isolation mechanism provided by the optical couple unit 665. The first resistor 671 and the second resistor 672 are electrically connected in series between the voltage input port 606 of the voltage regulator 605 and a voltage reference level such as the ground level. The third resistor 673 and the second switch 674 are electrically connected in series across opposite ends of the first resistor 671, i.e. the first resistor 671 is connected in parallel with the third resistor 673 and the second switch 674 serially connected. The second switch 674 can be a MOS field effect transistor or a junction field effect transistor having an on/off state in response to the switching signal Ssw.

Figure 7:
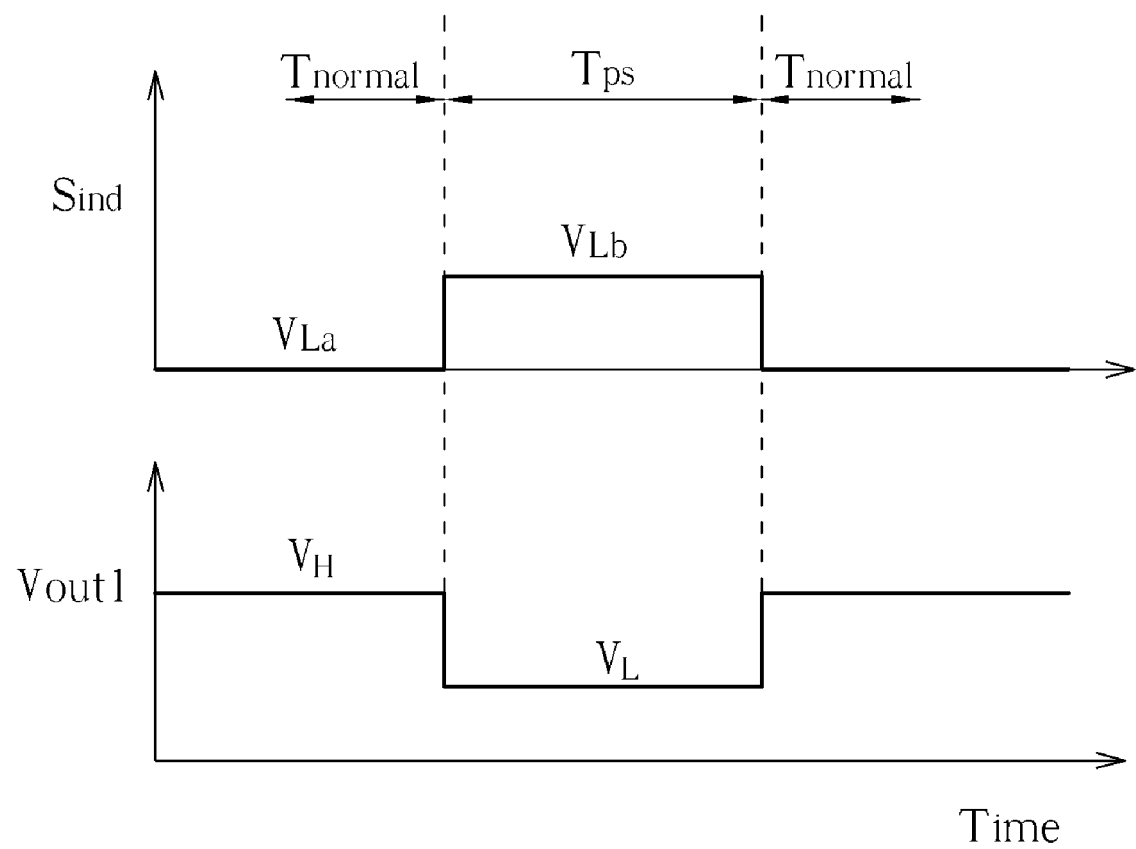
FIG. 7 is a schematic diagram showing related signal waveforms regarding the operation of the power system in FIG. 6, having time along the abscissa.

FIG. 7 is a schematic diagram showing related signal waveforms regarding the operation of the power system 600 in FIG. 6, having time along the abscissa. The signal waveforms in FIG. 7, from top to bottom, are the indication signal Sind and the first voltage Vout1. Please refer to FIG. 7 together with FIG. 6, when the indication signal Sind holds a first voltage level VLa for indicating a normal operation mode during an interval Tnormal, the switching signal generation unit 660 outputs the switching signal Ssw having low voltage level for turning off the second switch 674. In view of that, the third resistor 673 and the second switch 674 have no effect on the divided voltage Vdiv, and the divided voltage Vdiv is generated only based on the first resistor 671 and the second resistor 672. Under such situation, the feedback signal Sfb, outputted from the feedback processing circuit 615, is utilized for driving the power input module 620 to generate the first voltage Vout1 having a high voltage level $V_H$.

When the indication signal Sind holds a second voltage level VLb for indicating a power-saving operation mode during an interval Tps, the switching signal generation unit 660 outputs the switching signal Ssw having high voltage level for turning on the second switch 674. Therefore, the third resistor 673 and the second switch 674 have an effect to cause an increase of the divided voltage Vdiv for decreasing the voltage level of the feedback signal Sfb, i.e. the divided voltage Vdiv is generated not only based on the first resistor 671 and the second resistor 672 but also based on the third resistor 673 and the channel resistance of the second switch 674. Following a decrease of the feedback signal Sfb, the duty cycle of the control signal Sc is then reduced for generating the first voltage Vout1 having a low voltage level $V_L$. The low voltage level $V_L$ is slightly greater than the voltage level of the second voltage Vout2. If the voltage regulator 605 is a low dropout regulator, the low voltage level $V_L$ can be substantially identical to the voltage level of the second voltage Vout2. In other words, while entering the power-saving operation mode, the power input module 620 is required only to provide the first voltage Vout1 having the low voltage level $V_L$ for driving the voltage regulator 605 to generate the second voltage Vout2. Accordingly, compared with the prior art, the power system 600 is able to achieve higher power efficiency significantly.

Figure 8:
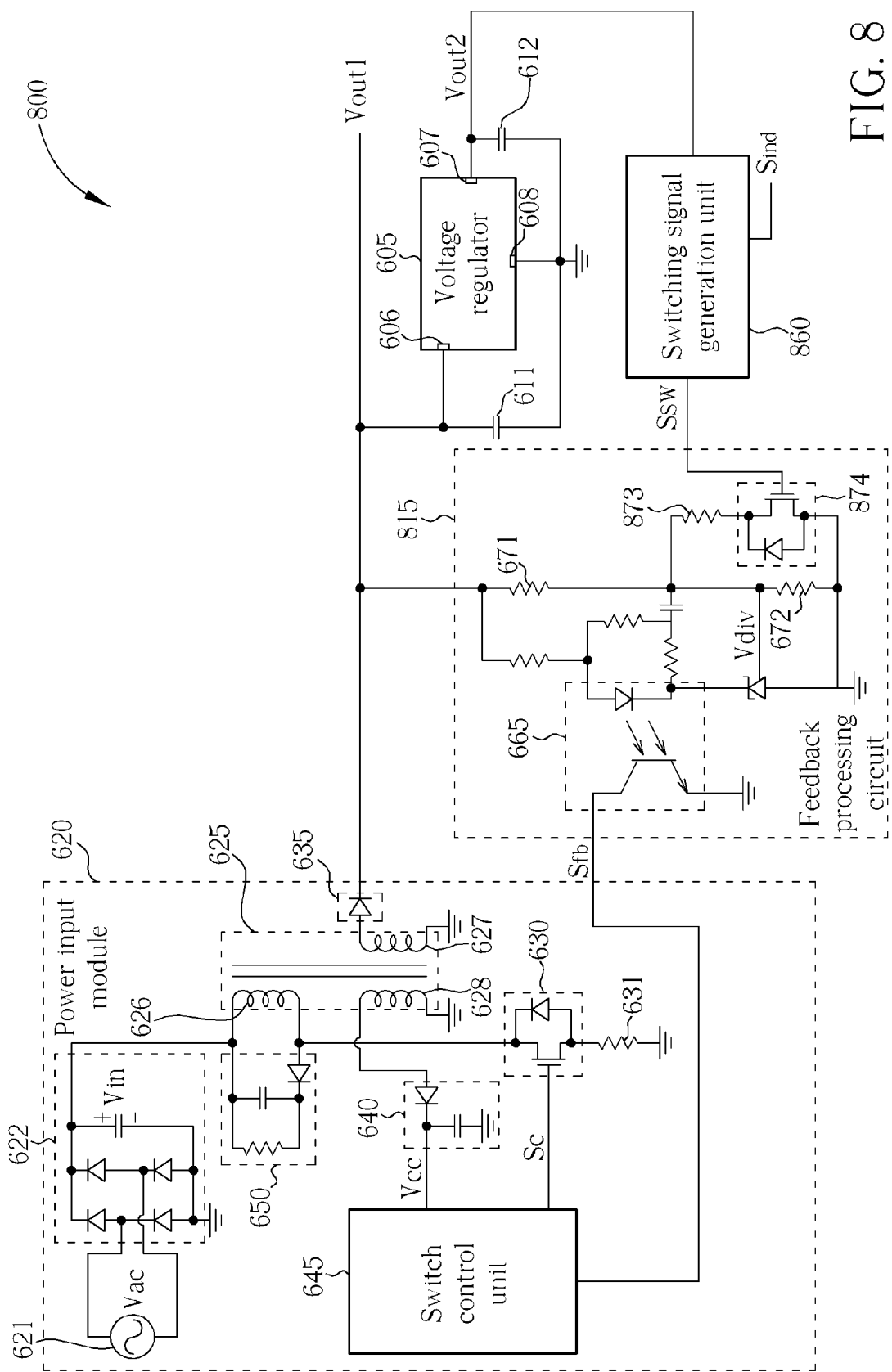
FIG. 8 is a circuit structure diagram schematically showing a power system in accordance with a fourth embodiment of the present invention.

Please refer to FIG. 8, which is a circuit structure diagram schematically showing a power system 800 in accordance with a fourth embodiment of the present invention. As shown in FIG. 8, the power system 800 is similar to the power system 600 shown in FIG. 6, differing in that the feedback processing circuit 615 and the switching signal generation unit 660 are respectively replaced with a feedback processing circuit 815 and a switching signal generation unit 860. The feedback processing circuit 815 comprises a third resistor 873 and a second switch 874 connected in series across opposite ends of the second resistor 672, i.e. the second resistor 672 rather than the first resistor 671 is connected in parallel with the third resistor 873 and the second switch 874 serially connected. The second switch 874 can be a MOS field effect transistor or a junction field effect transistor having an on/off state in response to the switching signal Ssw provided by the switching signal generation unit 860. The signal waveforms of the indication signal Sind and the first voltage Vout1 regarding the operation of the power system 800 are identical to the signal waveforms shown in FIG. 7. The circuit operation of the power system 800 is briefed as the followings.

When the indication signal Sind holds a first voltage level VLa for indicating a normal operation mode during an interval Tnormal, the switching signal generation unit 860 outputs the switching signal Ssw having high voltage level for turning on the second switch 874. Therefore, the third resistor 873 and the second switch 874 have an effect to cause a decrease of the divided voltage Vdiv for increasing the voltage level of the feedback signal Sfb, i.e. the divided voltage Vdiv is generated not only based on the first resistor 671 and the second resistor 672 but also based on the third resistor 873 and the channel resistance of the second switch 874. Following an increase of the feedback signal Sfb, the duty cycle of the control signal Sc is then increased for generating the first voltage Vout1 having a high voltage level $V_H$.

When the indication signal Sind holds a second voltage level VLb for indicating a power-saving operation mode during an interval Tps, the switching signal generation unit 860 outputs the switching signal Ssw having low voltage level for turning off the second switch 874. In view of that, the third resistor 873 and the second switch 874 have no effect on the divided voltage Vdiv, and the divided voltage Vdiv is generated only based on the first resistor 671 and the second resistor 672. Under such situation, the feedback signal Sfb, outputted from the feedback processing circuit 815, is utilized for driving the power input module 620 to generate the first voltage Vout1 having a low voltage level $V_L$. That is, while entering the power-saving operation mode, the power input module 620 is required only to provide the first voltage Vout1 having the low voltage level $V_L$ for driving the voltage regulator 605 to generate the stable second voltage Vout2 desired. Similarly, compared with the prior art, the power system 800 is also able to achieve higher power efficiency significantly.

Figure 9:
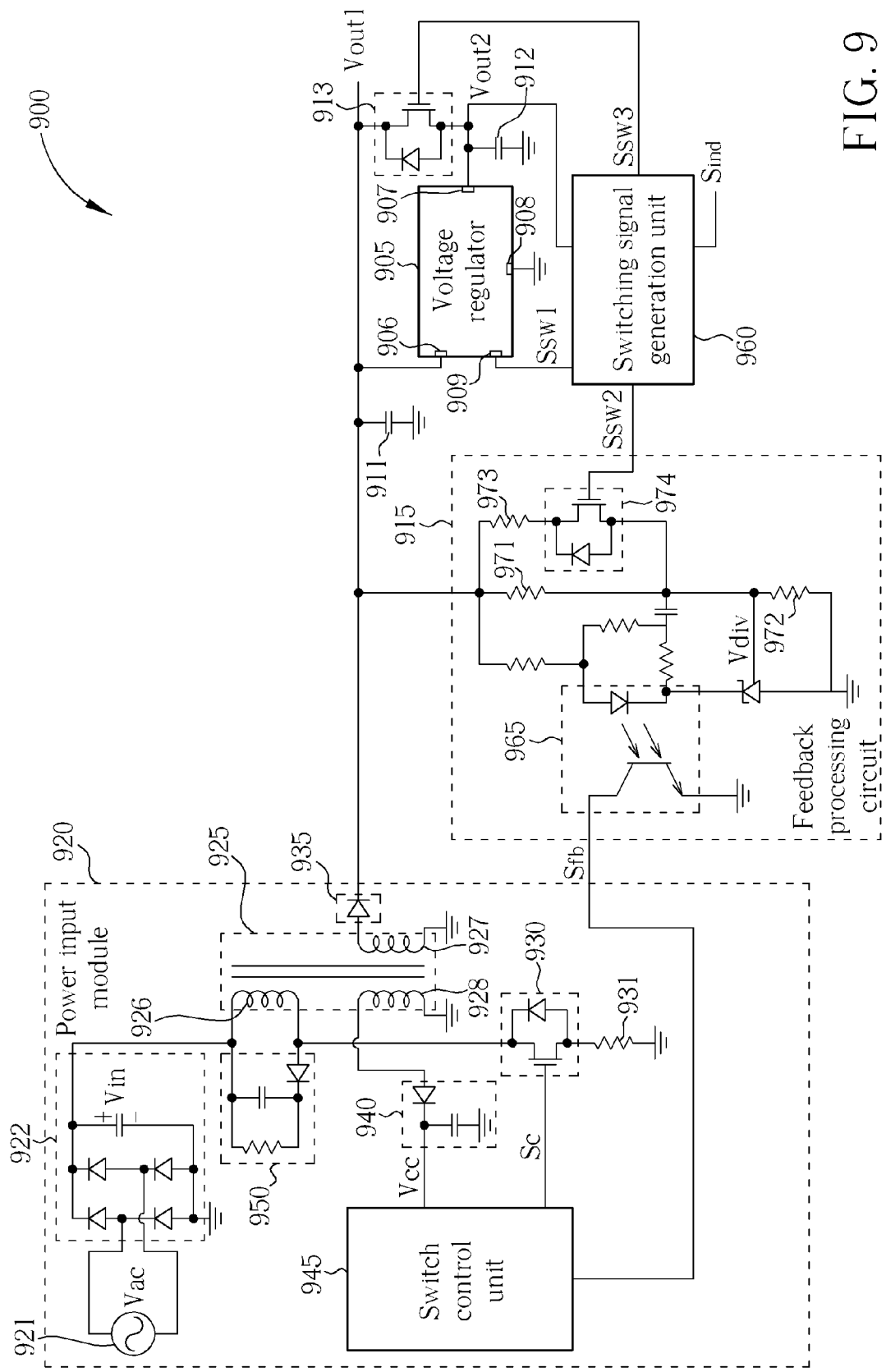
FIG. 9 is a circuit structure diagram schematically showing a power system in accordance with a fifth embodiment of the present invention.

Please refer to FIG. 9, which is a circuit structure diagram schematically showing a power system 900 in accordance with a fifth embodiment of the present invention. As shown in FIG. 9, the power system 900 comprises a voltage regulator 905, a first capacitor 911, a second capacitor 912, a first switch 913, a feedback processing circuit 915, a power input module 920, and a switching signal generation unit 960. The voltage regulator 905 includes a voltage input port 906 for receiving a first voltage Vout1, a voltage output port 907 for outputting a second voltage Vout2, an enable port 909 for receiving a first switching signal Ssw1, and a common port 908 electrically connected to a voltage reference level such as a ground level. The first capacitor 911 is electrically connected between the voltage input port 906 of the voltage regulator 905 and a voltage reference level such as the ground level. The second capacitor 912 is electrically connected between the voltage output port 907 of the voltage regulator 905 and a voltage reference level such as the ground level. The first switch 913, electrically connected between the voltage input port 906 and the voltage output port 907 of the voltage regulator 905, is employed to control an electrical connection between the voltage input port 906 and the voltage output port 907 of the voltage regulator 905 according to a third switching signal Ssw3. The first switch 913 can be a MOS field effect transistor or a junction field effect transistor. The power input module 920 comprises an alternating power supply 921, a first rectification/filter unit 922, a transformer 925, a second switch 930, a resistor 931, a rectification unit 935, a second rectification/filter unit 940, a switch control unit 945, and a snubber circuit 950. The internal circuit structure of the power input module 920 is identical to that of the power input module 220 shown in FIG. 2, and for the sake of brevity, further similar discussion thereof is omitted.

The switching signal generation unit 960, electrically connected to the voltage output port 907 of the voltage regulator 905, is powered with the second voltage Vout2. In another embodiment, the switching signal generation unit 960 can be electrically connected to the voltage input port 906 of the voltage regulator 905 so as to be powered with the first voltage Vout1. The switching signal generation unit 960 functions to generate the first switching signal Ssw1, a second switching signal Ssw2 and the third switching signal Ssw3 according to an indication signal Sind. The first switching signal Ssw1, the second switching signal Ssw2 and the third switching signal Ssw3 are used to control the circuit operations of the voltage regulator 905, the feedback processing circuit 915 and the first switch 913 respectively.

The feedback processing circuit 915, electrically connected to the voltage input port 906 of the voltage regulator 905 and the switching signal generation unit 960, is employed to generate the feedback signal Sfb according to the first voltage Vout1 and the second switching signal Ssw2. The feedback processing circuit 915 includes an optical couple unit 965, a first resistor 971, a second resistor 972, a third resistor 973, and a third switch 974. The optical couple unit 965, electrically connected to the switch control unit 945, is utilized for outputting the feedback signal Sfb. That is, the feedback processing circuit 915 outputs the feedback signal Sfb based on an electrical isolation mechanism provided by the optical couple unit 965. The first resistor 971 and the second resistor 972 are electrically connected in series between the voltage input port 906 of the voltage regulator 905 and a voltage reference level such as the ground level. The third resistor 973 and the third switch 974 are electrically connected in series across opposite ends of the first resistor 971, i.e. the first resistor 971 is connected in parallel with the third resistor 973 and the third switch 974 serially connected. The third switch 974 can be a MOS field effect transistor or a junction field effect transistor having an on/off state in response to the second switching signal Ssw2. The signal waveforms of the indication signal Sind and the first voltage Vout1 regarding the operation of the power system 900 are identical to the signal waveforms shown in FIG. 7. The circuit operation of the power system 900 is briefed as the followings.

When the indication signal Sind holds a first voltage level VLa for indicating a normal operation mode during an interval Tnormal, the switching signal generation unit 960 outputs the third switching signal Ssw3 and the second switching signal Ssw2 both having low voltage level for turning off the first switch 913 and the third switch 974 respectively. The switching signal generation unit 960 further outputs the first switching signal Ssw1 having enable state for enabling the voltage regulator 905. In view of that, the third resistor 973 and the third switch 974 have no effect on the divided voltage Vdiv, and the divided voltage Vdiv is generated only based on the first resistor 971 and the second resistor 972. Meanwhile, the first voltage Vout1 cannot be delivered to the voltage output port 907 of the voltage regulator 905 via the first switch 913. Under such situation, the feedback signal Sfb, outputted from the feedback processing circuit 915, is utilized for driving the power input module 920 to generate the first voltage Vout1 having a high voltage level $V_H$. Furthermore, the voltage regulator 905 is then able to generate the second voltage Vout2 outputted via the voltage output port 907 according to the first voltage Vout1.

When the indication signal Sind holds a second voltage level VLb for indicating a power-saving operation mode during an interval Tps, the switching signal generation unit 960 outputs the third switching signal Ssw3 and the second switching signal Ssw2 both having high voltage level for turning on the first switch 913 and the third switch 974 respectively. The switching signal generation unit 960 further outputs the first switching signal Ssw1 having disable state for disabling the voltage regulator 905. Therefore, the third resistor 973 and the third switch 974 have an effect to cause an increase of the divided voltage Vdiv for decreasing the voltage level of the feedback signal Sfb, i.e. the divided voltage Vdiv is generated not only based on the first resistor 971 and the second resistor 972 but also based on the third resistor 973 and the channel resistance of the third switch 974. Following a decrease of the feedback signal Sfb, the duty cycle of the control signal Sc is then reduced for generating the first voltage Vout1 having a low voltage level $V_L$. In the meantime, since the voltage regulator 905 is disabled by the first switching signal Ssw1, the first voltage Vout1 having the low voltage level $V_L$ is not required to drive the voltage regulator 905, and therefore the low voltage level $V_L$ can be set to be substantially identical to the voltage level of the second voltage Vout2. For that reason, the first voltage Vout1 can be delivered directly to the voltage output port 907 of the voltage regulator 905 via the first switch 913. In other words, while entering the power-saving operation mode, the load powered by the second voltage Vout2 is actually powered directly by the first voltage Vout1 having the low voltage level $V_L$. Accordingly, compared with the prior art, the power system 900 is able to achieve higher power efficiency significantly.

Figure 10:
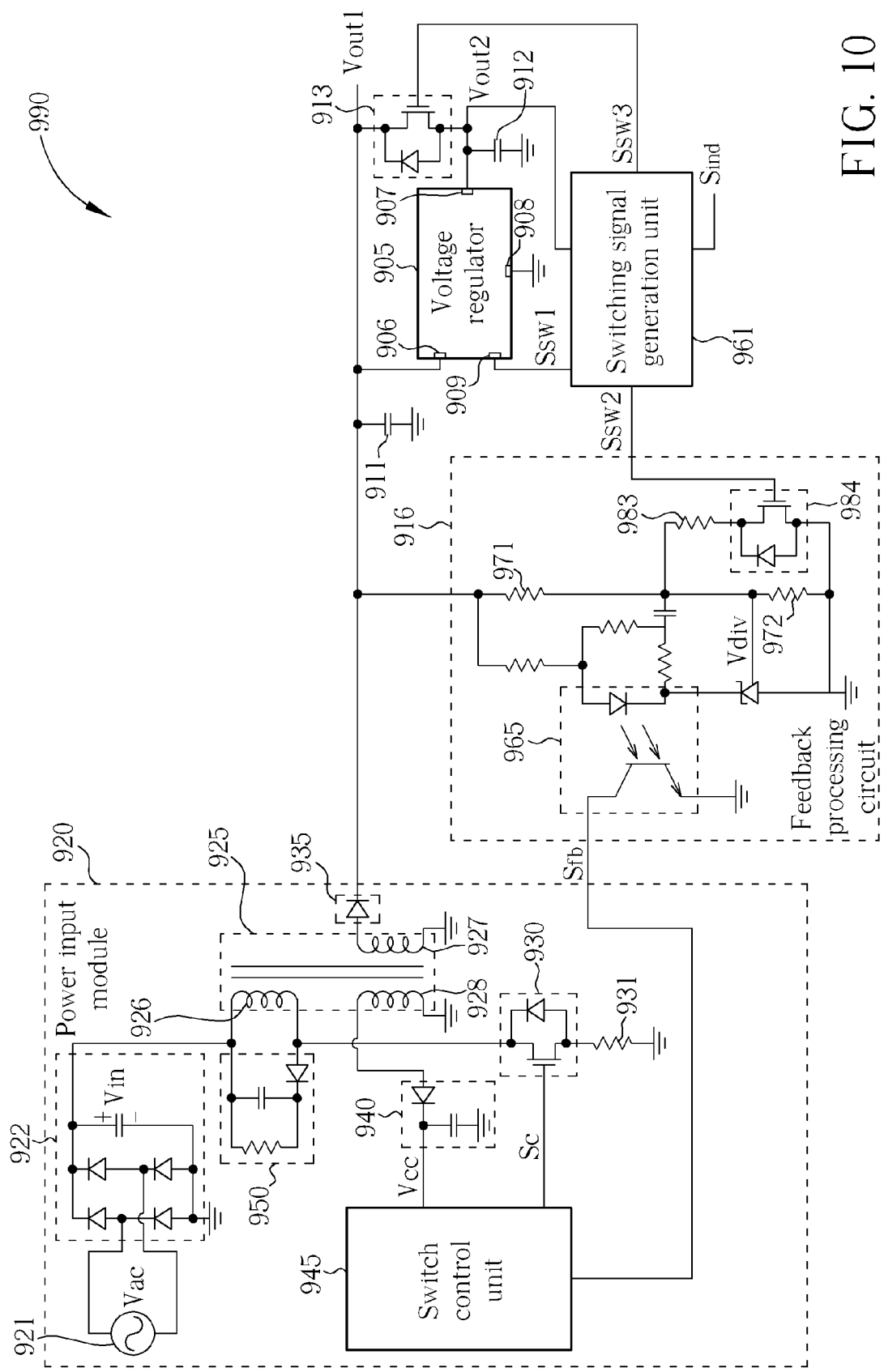
FIG. 10 is a circuit structure diagram schematically showing a power system in accordance with a sixth embodiment of the present invention.

Please refer to FIG. 10, which is a circuit structure diagram schematically showing a power system 990 in accordance with a sixth embodiment of the present invention. As shown in FIG. 10, the power system 990 is similar to the power system 900 shown in FIG. 9, differing in that the feedback processing circuit 915 and the switching signal generation unit 960 are respectively replaced with a feedback processing circuit 916 and a switching signal generation unit 961. The feedback processing circuit 916 comprises a third resistor 983 and a third switch 984 connected in series across opposite ends of the second resistor 972, i.e. the second resistor 972 rather than the first resistor 971 is connected in parallel with the third resistor 983 and the third switch 984 serially connected. The third switch 984 can be a MOS field effect transistor or a junction field effect transistor having an on/off state in response to the second switching signal Ssw2 provided by the switching signal generation unit 961. The signal waveforms of the indication signal Sind and the first voltage Vout1 regarding the operation of the power system 990 are identical to the signal waveforms shown in FIG. 7. The circuit operation of the power system 990 is briefed as the followings.

When the indication signal Sind holds a first voltage level VLa for indicating a normal operation mode during an interval Tnormal, the switching signal generation unit 961 outputs the third switching signal Ssw3 having low voltage level for turning off the first switch 913 and the second switching signal Ssw2 having high voltage level for turning on the third switch 984. The switching signal generation unit 961 further outputs the first switching signal Ssw1 having enable state for enabling the voltage regulator 905. Therefore, the third resistor 983 and the third switch 984 have an effect to cause a decrease of the divided voltage Vdiv for increasing the voltage level of the feedback signal Sfb, i.e. the divided voltage Vdiv is generated not only based on the first resistor 971 and the second resistor 972 but also based on the third resistor 983 and the channel resistance of the third switch 984. Following an increase of the feedback signal Sfb, the duty cycle of the control signal Sc is then increased for generating the first voltage Vout1 having a high voltage level $V_H$; in turn, the voltage regulator 905 generates the second voltage Vout2 outputted via the voltage output port 907 based on the first voltage Vout1. Besides, since the first switch 913 is turned off, the first voltage Vout1 cannot be delivered to the voltage output port 907 of the voltage regulator 905 via the first switch 913.

When the indication signal Sind holds a second voltage level VLb for indicating a power-saving operation mode during an interval Tps, the switching signal generation unit 961 outputs the third switching signal Ssw3 having high voltage level for turning on the first switch 913 and the second switching signal Ssw2 having low voltage level for turning off the third switch 984. The switching signal generation unit 961 further outputs the first switching signal Ssw1 having disable state for disabling the voltage regulator 905. In view of that, the third resistor 983 and the third switch 984 have no effect on the divided voltage Vdiv, and the divided voltage Vdiv is generated only based on the first resistor 971 and the second resistor 972. Under such situation, the feedback signal Sfb, outputted from the feedback processing circuit 916, is utilized for driving the power input module 920 to generate the first voltage Vout1 having a low voltage level $V_L$. Since the voltage regulator 905 is disabled, the first voltage Vout1 having the low voltage level $V_L$ is not required to drive the voltage regulator 905, and therefore the low voltage level $V_L$ can be set to be substantially identical to the voltage level of the second voltage Vout2. For that reason, the first voltage Vout1 can be delivered directly to the voltage output port 907 of the voltage regulator 905 via the first switch 913. In other words, while entering the power-saving operation mode, the load powered by the second voltage Vout2 is actually powered directly by the first voltage Vout1 having the low voltage level $V_L$. Accordingly, compared with the prior art, the power system 990 is able to achieve higher power efficiency significantly.

In conclusion, by means of either periodically disabling the switch control unit or providing a low stable voltage only for persistent-active load while entering power-saving operation mode, the power system of the present invention is able to achieve higher power efficiency significantly compared with the prior art.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A power system comprising:
    a voltage regulator having a voltage input port for receiving a first voltage, and a voltage output port for outputting a second voltage;
    a first capacitor electrically connected between the voltage input port of the voltage regulator and a voltage reference level;
    a power input module comprising:
        a transformer having a primary winding for receiving an input voltage, a secondary winding, and an auxiliary winding;
        a rectification unit, electrically connected between the secondary winding and the voltage input port of the voltage regulator, for generating the first voltage;
        a switch, electrically connected to the primary winding in series, for controlling a current flowing through the primary winding; and
        a switch control unit, electrically connected to the auxiliary winding and the switch, for controlling the switch; and
    a switching signal generation unit, electrically connected to the voltage output port of the voltage regulator, for generating a switching signal to disable the switch control unit during a disable interval so as to decrease the first voltage from a first predetermined voltage to a second predetermined voltage.

2. The power system of claim 1, wherein the power input module further comprises:
    a first rectification/filter unit, electrically connected to the primary winding, for converting an alternating input voltage into the input voltage;
    a second rectification/filter unit, electrically connected between the auxiliary winding and the switch control unit, for performing rectification and filter operations on an induced voltage of the auxiliary winding so as to generate a power voltage for powering the switch control unit;
    a snubber circuit electrically connected to the primary winding and the switch; and
    a resistor electrically connected between the switch and a voltage reference level.

3. The power system of claim 1, further comprising:
    an optical couple unit, electrically connected between the switching signal generation unit and the switch control unit, for providing an electrical isolation mechanism between the switching signal generation unit and the switch control unit.

4. The power system of claim 1, wherein the first voltage has a voltage ripple swing, the switching signal generation unit functions to set the disable interval according to the voltage ripple swing and a capacitance of the first capacitor, and the switching signal generation unit generates the switching signal for disabling the switch control unit so as to continue turning off the switch during the disable interval.

5. The power system of claim 1, further comprising:
a voltage dividing unit, electrically connected between the voltage input port of the voltage regulator and a voltage reference level, for generating a divided voltage of the first voltage, the divided voltage being furnished to the switching signal generation unit;
wherein the switching signal generation unit generates the switching signal according to the divided voltage.

6. The power system of claim 5, wherein the divided voltage has a voltage ripple swing, the voltage ripple swing is between a high ripple voltage and a low ripple voltage, the switching signal generation unit generates the switching signal for disabling the switch control unit so as to continue turning off the switch at a first time when the divided voltage is rising to the high ripple voltage, and the switching signal generation unit generates the switching signal for enabling the switch control unit at a second time when the divided voltage is falling to the low ripple voltage;
wherein the disable interval is a time difference between the second time and the first time.

7. The power system of claim 1, wherein the switching signal generation unit generates the switching signal by detecting the first voltage.

8. The power system of claim 7, wherein the first voltage has a voltage ripple swing, the voltage ripple swing is between a high ripple voltage and a low ripple voltage, the switching signal generation unit generates the switching signal for disabling the switch control unit so as to continue turning off the switch at a first time when the first voltage is rising to the high ripple voltage, and the switching signal generation unit generates the switching signal for enabling the switch control unit at a second time when the first voltage is falling to the low ripple voltage;
wherein the disable interval is a time difference between the second time and the first time.

9. A power system comprising:
a voltage regulator having a voltage input port for receiving a first voltage and a voltage output port for outputting a second voltage;
a switching signal generation unit, electrically connected to the voltage output port or the voltage input port of the voltage regulator, for generating a switching signal according to an indication signal;
a feedback processing circuit, electrically connected to the voltage input port of the voltage regulator and the switching signal generation unit, for generating a feedback signal according to the first voltage and the switching signal; and
a power input module comprising:
a transformer having a primary winding for receiving an input voltage, a secondary winding, and an auxiliary winding;
a rectification unit, electrically connected between the secondary winding and the voltage input port of the voltage regulator, for generating the first voltage;
a first switch, electrically connected to the primary winding in series, for controlling a current flowing through the primary winding; and
a switch control unit, electrically connected to the auxiliary winding and the first switch, for generating a control signal to control the first switch according to the feedback signal.

10. The power system of claim 9, further comprising:
a first capacitor electrically connected between the voltage input port of the voltage regulator and a voltage reference level; and
a second capacitor electrically connected between the voltage output port of the voltage regulator and a voltage reference level.

11. The power system of claim 9, wherein the power input module further comprises:
a first rectification/filter unit, electrically connected to the primary winding, for converting an alternating input voltage into the input voltage;
a second rectification/filter unit, electrically connected between the auxiliary winding and the switch control unit, for performing rectification and filter operations on an induced voltage of the auxiliary winding so as to generate a power voltage for powering the switch control unit;
a snubber circuit electrically connected to the primary winding and the first switch; and
a resistor electrically connected between the first switch and a voltage reference level.

12. The power system of claim 9, wherein the feedback processing circuit comprises:
an optical couple unit, electrically connected to the switch control unit, for outputting the feedback signal; and
a first resistor and a second resistor electrically connected in series between the voltage input port of the voltage regulator and a voltage reference level;
wherein the feedback processing circuit outputs the feedback signal based on an electrical isolation mechanism provided by the optical couple unit.

13. The power system of claim 12, wherein the feedback processing circuit further comprises:
a third resistor and a second switch, electrically connected in series across opposite ends of the first resistor, the second switch being controlled by the switching signal;
wherein the switching signal generation unit generates the switching signal for turning off the second switch so as to adjust the feedback signal for modulating the control signal to output the first voltage having a high voltage level when the indication signal is a first state signal; and
the switching signal generation unit generates the switching signal for turning on the second switch so as to adjust the feedback signal for modulating the control signal to output the first voltage having a low voltage level when the indication signal is a second state signal.

14. The power system of claim 12, wherein the feedback processing circuit further comprises:
a third resistor and a second switch, electrically connected in series across opposite ends of the second resistor, the second switch being controlled by the switching signal;
wherein the switching signal generation unit generates the switching signal for turning on the second switch so as to adjust the feedback signal for modulating the control signal to output the first voltage having a high voltage level when the indication signal is a first state signal; and
the switching signal generation unit generates the switching signal for turning off the second switch so as to adjust the feedback signal for modulating the control signal to output the first voltage having a low voltage level when the indication signal is a second state signal.

15. A power system comprising:
a voltage regulator having a voltage input port for receiving a first voltage, a voltage output port for outputting a second voltage, and an enable port;

a switching signal generation unit, electrically connected to the voltage output port or the voltage input port of the voltage regulator, for generating the first switching signal to the enable port, a second switching signal and a third switching signal according to an indication signal;

a feedback processing circuit, electrically connected to the voltage input port of the voltage regulator and the switching signal generation unit, for generating a feedback signal according to the first voltage and the second switching signal;

a first switch, electrically connected between the voltage input port and the voltage output port of the voltage regulator, for controlling an electrical connection between the voltage input port and the voltage output port of the voltage regulator according to the third switching signal; and a power input module comprising:
a transformer having a primary winding for receiving an input voltage, a secondary winding, and an auxiliary winding;
a rectification unit, electrically connected between the secondary winding and the voltage input port of the voltage regulator, for generating the first voltage;
a second switch, electrically connected to the primary winding in series, for controlling a current flowing through the primary winding; and
a switch control unit, electrically connected to the auxiliary winding and the second switch, for generating a control signal to control the second switch according to the feedback signal.

16. The power system of claim 15, further comprising:
a first capacitor electrically connected between the voltage input port of the voltage regulator and a voltage reference level;
a second capacitor electrically connected between the voltage output port of the voltage regulator and a voltage reference level.

17. The power system of claim 15, wherein the power input module further comprises:
a first rectification/filter unit, electrically connected to the primary winding, for converting an alternating input voltage into the input voltage;
a second rectification/filter unit, electrically connected between the auxiliary winding and the switch control unit, for performing rectification and filter operations on an induced voltage of the auxiliary winding so as to generate a power voltage for powering the switch control unit;
a snubber circuit electrically connected to the primary winding and the second switch; and
a resistor electrically connected between the second switch and a voltage reference level.

18. The power system of claim 15, wherein the feedback processing circuit comprises:
an optical couple unit, electrically connected to the switch control unit, for outputting the feedback signal; and
a first resistor and a second resistor electrically connected in series between the voltage input port of the voltage regulator and a voltage reference level;
wherein the feedback processing circuit outputs the feedback signal based on an electrical isolation mechanism provided by the optical couple unit.

19. The power system of claim 18, wherein the feedback processing circuit further comprises:
a third resistor and a third switch, electrically connected in series across opposite ends of the first resistor, the third switch being controlled by the second switching signal;
wherein the switching signal generation unit generates the first switching signal for enabling the voltage regulator, the third switching signal for turning off the first switch, and the second switching signal for turning off the third switch so as to adjust the feedback signal for modulating the control signal to output the first voltage having a high voltage level when the indication signal is a first state signal; and the switching signal generation unit generates the first switching signal for disabling the voltage regulator, the third switching signal for turning on the first switch, and the second switching signal for turning on the third switch so as to adjust the feedback signal for modulating the control signal to output the first voltage having a low voltage level when the indication signal is a second state signal.

20. The power system of claim 18, wherein the feedback processing circuit further comprises:
a third resistor and a third switch, electrically connected in series across opposite ends of the second resistor, the third switch being controlled by the second switching signal;
wherein the switching signal generation unit generates the first switching signal for enabling the voltage regulator, the third switching signal for turning off the first switch, and the second switching signal for turning on the third switch so as to adjust the feedback signal for modulating the control signal to output the first voltage having a high voltage level when the indication signal is a first state signal; and the switching signal generation unit generates the first switching signal for disabling the voltage regulator, the third switching signal for turning on the first switch, and the second switching signal for turning off the third switch so as to adjust the feedback signal for modulating the control signal to output the first voltage having a low voltage level when the indication signal is a second state signal.

* * * * *